May 11, 1943.  LE ROY L. STEVENS  2,318,976
NUT SEPARATING MACHINE
Filed Feb. 25, 1941  3 Sheets-Sheet 1

INVENTOR
LEROY L. STEVENS
BY
HARRIS, KIECH, FOSTER & HARRIS
ATTORNEYS.

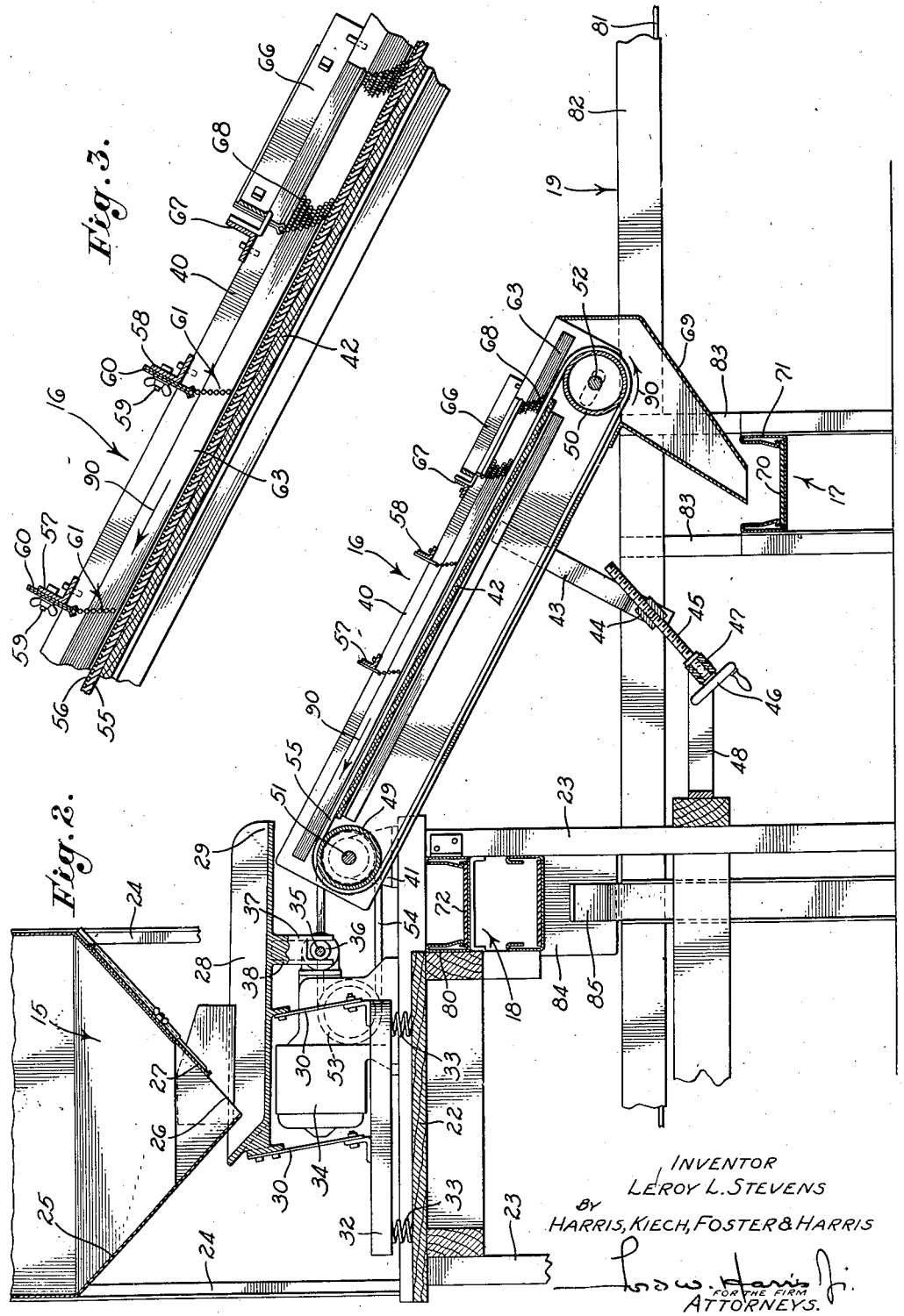

May 11, 1943.　　　LE ROY L. STEVENS　　　2,318,976
NUT SEPARATING MACHINE
Filed Feb. 25, 1941　　　3 Sheets-Sheet 3

INVENTOR
LEROY L. STEVENS
BY
HARRIS, KIECH, FOSTER & HARRIS
ATTORNEYS.

Patented May 11, 1943

2,318,976

UNITED STATES PATENT OFFICE 2,318,976

NUT SEPARATING MACHINE

Le Roy L. Stevens, Los Angeles, Calif., assignor to California Walnut Growers Association, Los Angeles, Calif., a corporation of California Application February 25, 1941, Serial No. 380,439

7 Claims. (Cl. 209—114)

My invention relates to a method and apparatus for treating a mixture comprised of components of different types so as to separate from the mixture one or more of the components. The invention is particularly adapted for use in treating a mixture of cracked nuts comprised of free nut kernels, free nut shells, and nut shells containing kernels, and, consequently, for the purpose of illustration the invention will be described in connection with such use. It is to be understood, however, that the invention is susceptible of other uses than the one described, and I do not intend to be limited to the described embodiment or use.

In the walnut cracking art it is standard practice to initially crack the shells of nuts so as to facilitate removal and separation of the nut kernels from the shells. An ideal shell cracking operation would be one in which the shells of the nuts would be cracked so as to free the nut kernels from the shells so that there remained only whole kernels and the shells. Unfortunately, no nut cracking machine which will attain this ideal result upon a large production capacity basis is known to the art. The best of such commercial machines now in use in the art may succeed in cracking the nuts so that a few whole kernels are secured from the cracked nuts, but there are also inevitably produced a high proportion of half kernels, quarter kernels, small pieces of kernel, and pieces of shell containing kernels which must be subsequently removed by recracking or picking. In the past, the removal from the cracked nuts of pieces of shell containing kernels, which must be recracked or picked to remove the kernels, has been done by hand labor, which is expensive and time consuming. It is therefore a primary object of my invention to provide an apparatus for separating pieces of shell containing kernels from a mixture of such pieces, free kernels, and pieces of shell. It is a further object of my invention to provide such an apparatus in which separation of the pieces of shell containing kernels is continuous from a continuous stream of cracked nuts and pieces thereof.

Pieces of cracked nuts which still contain kernels which must be picked to remove the kernels are of a variety of shapes and sizes, but may be broadly classified into two shapes: (a) those which will roll by gravity down an inclined plane, which I refer to hereinafter as "rollers"; and (b) those which will not, which I refer to as "non-rollers." It is another object of my invention to provide an apparatus for treating a continuous flow of cracked nuts, in which the rollers are continuously removed from the flow.

As indicated, when nuts are cracked by a commercial cracking machine, the product includes large and small pieces of nut kernels, pieces of free shell, and pieces of shell containing nut kernels which must be picked or recracked. These components of the product must be separated, and this has heretofore been done largely by hand labor, which is expensive and not well adapted to a large capacity production. It is therefore a further object of my invention to provide a device adapted to separate a mixture of pieces of cracked nuts into desired components. A further object is to provide such a machine which is wholly automatic and continuous in its operation.

Other objects and advantages will be evident from the following specification and the drawings, which are for the purpose of illustration only and in which:

Fig. 2 is an elevational view, partly in section, taken on the line 2—2 of Fig. 1.

Fig. 3 is an enlarged section of a fragment of Fig. 2.

Figure 1:
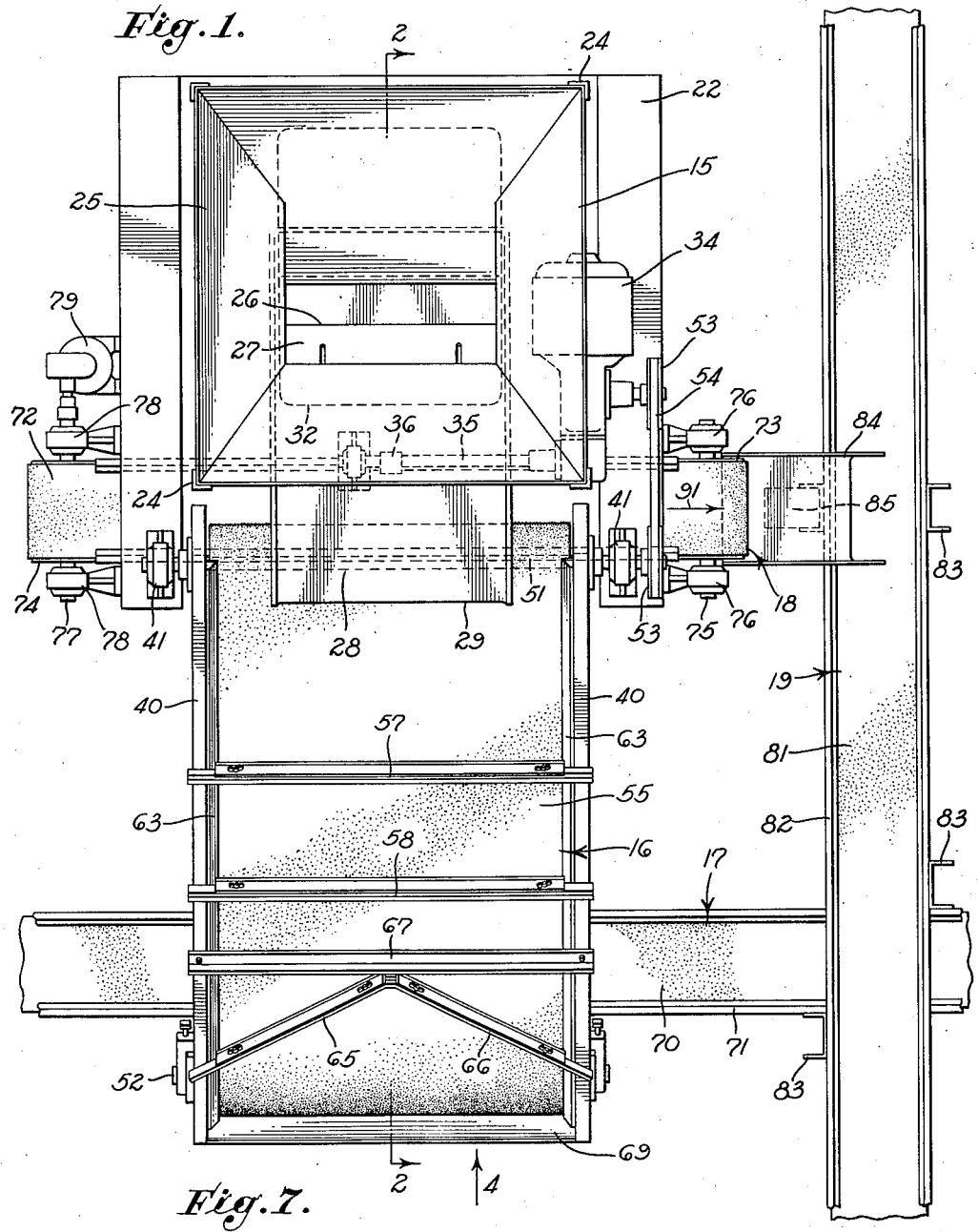
Fig. 1 is a plan view of preferred machinery embodying my invention.

Referring to the drawings, and particularly Fig. 1, the general units of my device are a feed means 15, a separating means 16, a first conveyor means 17, an intermediate conveyor means 18, and a second conveyor means 19.

Figure 4:
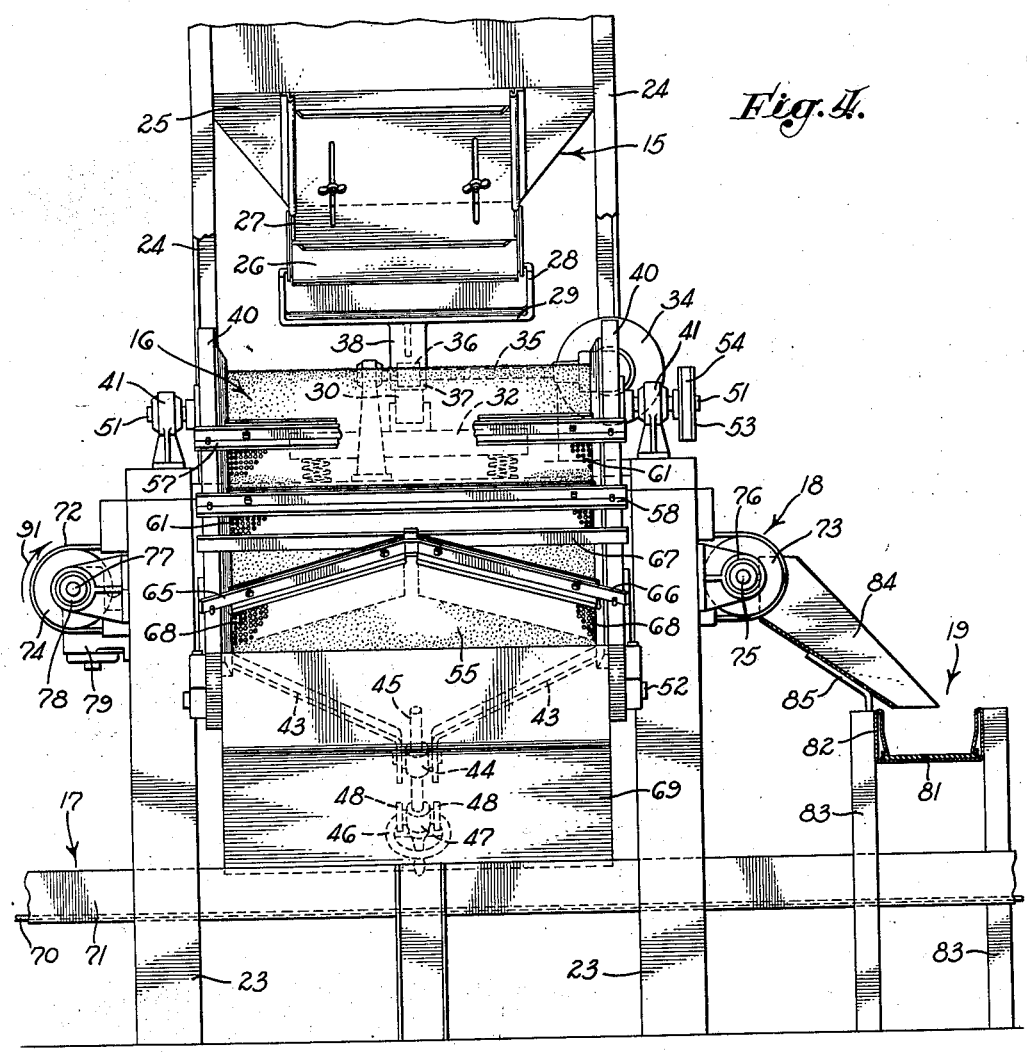
Fig. 4 is an end view, partly in section, taken in the direction indicated by the arrow 4 in Fig. 1.

Referring particularly to Fig. 2, I show a platform 22 suitably supported on standards 23, the platform being adapted to support the feed means 15 of my invention. Suitably fixed to the platform 22 are uprights 24 which carry a hopper 25 having a transverse slot 26 in the bottom thereof, the width of which is adjustable by means of a sliding plate 27 adjustably fixed to the hopper. The transverse slot 26 is disposed over a feeding tray 28 having an open forward end 29. The feeding tray 28 is supported on flexible arms 30, preferably made of metal, the upper ends of which are fixed to the feeding tray and the lower ends of which are suitably fixed to a sub-base 32. The sub-base 32 is resiliently mounted on the platform 22, preferably by coiled springs 33 therebetween. As will be noted, the feeding tray 28 is mounted so that the bottom thereof slopes downwardly towards its open forward end 29. Also mounted on the platform 22 at one side thereof, as shown in Figs. 2 and 4, is an electric motor 34 having a power take-off shaft 35 suitably geared to the drive shaft of the motor and having an eccentric 36 mounted thereon which fits between depending arms 37 of a yoke 38 formed on or suitably secured to the bottom of the feeding tray 28, as shown in Fig. 2.

Figure 7:
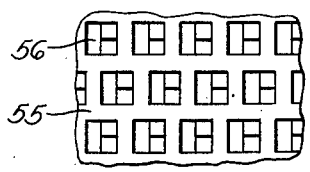
Fig. 7 is an enlarged plan view of a fragment of the outer surface of the belt 55.
Figures 5, 6:
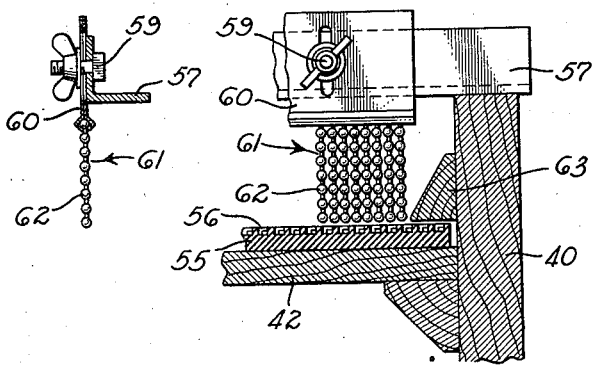
Fig. 5 is a horizontal cross-sectional view of an enlarged fragment of the device, showing a portion of one of the delaying screens.
Fig. 6 is an end view of the fragment shown in Fig. 5, showing a portion of the cooperating elements.

The separating means 16 includes parallel side wall members 40, the upper ends of which are suitably pivotally supported on bearing standards 41. Rigidly securing the sides 40 together in parallel spaced relationship is a bottom member 42 suitably secured to the side wall members, the bottom member near its lower end having depending therefrom a pair of yoke arms 43 rigidly secured thereto. Pivotally secured between the yoke arms 43 is an internally threaded block 44 which threadedly receives a threaded rod 45 to the lower end of which is suitably fixed a handwheel 46, the lower end of the threaded rod being journaled in a plain bearing 47 pivotally mounted between supporting arms 48 suitably fixed to one of the standards 23. As will be understood, rotation of the rod 45 by means of the handwheel 46 will cause the threaded block 44 to advance or retract thereon to raise or lower the lower end of the separating means 16. Disposed between the parallel side wall members 40 are upper and lower belt rollers 49 and 50, respectively, the upper roller 49 being fixed to a drive shaft 51 journaled in the bearing standards 41, and the lower belt roller 50 being mounted rotatably on an axle 52 suitably journaled in the parallel side wall members 40. The drive shaft 51 is operatively connected to the electric motor 34 through pulleys 53 and a pulley belt 54. Carried on the upper and lower belt rollers 49 and 50 is a continuous belt member 55, preferably formed of rubber or other resilient material, and having a rough outer face preferably provided with corrugations 56, as best shown in Fig. 7. Extending between the side wall members 40, and suitably fixed thereto, is an upper transverse bar member 57 and a lower transverse bar member 58, the details of which are the same so that only the construction of the bar member 57, the details of which are shown in Figs. 5 and 6, will be described. Connected to the bar member 57, as by a suitable bolt construction 59, is a screen plate 60 to which is secured a screen member 61. The screen member 61 may be of any desired type, but I prefer to use a screen construction composed of a plurality of strings of beads 62 secured adjacent each other and depending from the screen plate 60, as best shown in Figs. 5 and 6. As will be noted, each of the bead strings 62 depends to a point adjacent the upper surface of the continuous belt member 55, although if desired they may overlap the same. As will also be noted, overlap strips 63 are provided along each of the parallel side wall members 40 so as to overlap the edges of the belt 55 to prevent material from wedging between the edges of the belt and the side wall members. It is also to be noted from Fig. 2 that the open forward end 29 of the feeding tray 28 projects over the upper end of the continuous belt member 55 so that material falling from the feeding tray will fall onto the upper end of the belt member.

Supported on the lower ends of the side wall members 40 are angled members 65 and 66, the upper ends of which converge and are supported on a cross member 67, each of the angled members being provided with a screen member 68 similar to the screen members 61 and affixed to the angled members in the same manner that the screen members 61 are affixed to the upper and lower transverse bar members 57 and 58, respectively. Connected to the lower end of the separating means 16 is a discharge chute element 69 which is in the form of a hopper adapted to collect and direct the flow of material coming thereinto from the lower end of the continuous belt member 55. Below the discharge chute element 69 and adapted to receive the discharge therefrom is the first conveyor means 17 of my invention, which comprises a standard conveyor belt 70 running in a belt trough 71, as is well known in the art.

The intermediate conveyor means 18 includes a continuous belt 72 disposed on suitable belt rollers 73 and 74, the belt roller 73 being mounted on an axle 75 journaled in bearing standards 76, and the roller 74 being mounted on an axle 77 journaled in bearing standards 78 and connected through suitable gearing with the drive shaft of an auxiliary electric motor 79. The continuous belt 72 is adapted to ride in an intermediate belt trough 80, as is well known in the art.

The second conveyor means 19 includes a conveyor belt 81 running in a belt trough 82 supported on suitable standards 83, as is well known in the art. A hopper 84 is secured by suitable brackets 85 to the standards 83 so that the upper open end thereof is below the belt 72 where it runs over the belt roller 73, and the lower end thereof is positioned over the belt 81, so that material received by the continuous belt 72 will fall off the end thereof and pass downwardly through the hopper 84 onto the belt 81, to be conveyed to a suitable point of storage or use (not shown).

In operation, cracked nuts are fed into the hopper 25 of the feed means 15 by any suitable means. As indicated above, these cracked nuts include pieces of free nut shells, pieces of free nut kernels, rollers, and non-rollers, in an intimate mixture. This mixture is fed through the transverse slot 26 of the hopper 25 into the feeding tray 28, and the rate of feed thereof may be controlled by adjustment of the width of the transverse slot by means of the sliding plate 27. The electric motor 34 is energized to rotate the power take-off shaft 35, causing rotation of the eccentric 36, which, through the yoke 38, reciprocates the feeding tray 28 on the flexible arm 30. Since the open forward end 29 of the feeding tray 28 slopes downwardly toward the separating means 16, reciprocation of the feeding tray causes the mixture thereon to work slowly down and off the open forward end thereof so as to fall onto the continuous belt member 55 of the separating means 16.

When the cracked nut mixture from the feeding tray 28 falls onto the continuous belt member 55, the larger pieces of the mixture and even some of the smaller pieces will start to roll down the inclined surface of the belt member toward the lower belt roller 50. The continuous belt member 55 is continuously moved in the direction of the arrows 90, shown in Figs. 2 and 3, which is countercurrent to the normal direction of flow of the mixture down the belt member toward the lower roller 50. Due to the rough outer surface of the continuous belt member 55 afforded by the corrugations 56, many of the small pieces comprising the mixture and many of the relatively flat pieces thereof are quickly stopped by the corrugations and thereafter move upwardly with the belt. The transverse screen members 61 and the angled screen members 68 retard and finally stop the rolling movement of all of the components of the cracked nut mixture rolling downwardly along the belt member 55, with the exception of the rollers which readily pass through the screens and downwardly over the surface of the continuous belt member. Thus, eventually all of the ingredients of the mixture stop their rolling motion relative to the continuous belt member 55 with the exception of the rollers, which pass on downwardly thereover, off the end of the belt member and into the discharge chute 69, through which they fall onto the conveyor belt 70 of the first conveyor means 17. The balance of the components of the nut mixture, which include the free shells, the free kernels, and the non-rollers which have stopped their rolling action relative to the continuous belt member 55, are carried upwardly thereon countercurrent to the direction of the input flow of the mixture from the open forward end 29 of the feeding tray 28, and fall off the upper end thereof into the intermediate conveyor means 18 and onto the continuous belt 72. The continuous belt 72 is continuously rotated in the direction of the arrows 91 shown in Figs. 1 and 4, by the auxiliary electric motor 79 through the described drive connection thereof, and the part of the mixture falling onto the continuous belt 72 is carried thereby in the intermediate belt trough 80 and hopper 84 and onto the belt 81 of the second conveyor means 19 which conveys the same to any desired point.

It will thus be appreciated that my apparatus provides means whereby a mixture, such as a body of cracked nuts, may be separated into its components, and particularly so that a portion of the mixture, such as the rollers in the cracked nut mixture described, may be separated and conveyed to a suitable point for retreatment. It is also to be noted that my separation process may be continuous so as to handle a large capacity of a mixture of materials to be separated into its components. In practice, I have found that a machine built in conformity with the foregoing specification will operate to separate a relatively high percentage by weight of rollers from a mixture of cracked nuts. The exact percentage separated out by my invention depends, of course, on a number of factors, but I have found that the device will under normal conditions of operation separate rollers from a mixture of cracked walnuts amounting to between 40% and 60% by weight of the mixture initially fed to the machine.

Although I have shown and described a preferred embodiment of my invention, it will be recognized by those skilled in the art that certain parts and elements thereof are the mechanical equivalents of other parts and elements which may be substituted therefor without departing from the spirit of my invention, and accordingly I do not intend to be limited to the specific embodiment shown, or the construction thereof, but desire to be afforded the full scope of the following claims.

I claim as my invention:

1. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal, said belt having relatively deep corrugations in its upper surface; feed means for feeding a mixture of cracked nuts onto said upper surface of said belt adjacent the upper end thereof, said mixture including nut kernel containing shells capable of rolling down said belt; means for retarding the normal movement of said mixture downwardly on said upper surface of said belt toward the lower end thereof, including a supporting member transverse to said belt and having suspended therefrom a plurality of strings of bead members adapted to cooperate with said corrugations to retard said normal movement; receiving means for receiving said nut kernel containing shells at the lower end of said upper surface of said belt; means for rotating one of said belt rollers so as to move said upper surface of said belt upwardly to carry other components of said mixture thereon countercurrent to the direction of movement of said nut kernel containing shells; and means for adjusting the angle of said upper surface of said belt with the horizontal so as to vary the tendency of said mixture to move down said upper surface toward the lower end thereof.

2. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal, said belt having a corrugated upper surface; feed means for feeding a mixture of cracked nuts onto said upper surface of said belt adjacent the upper end thereof, said mixture including nut kernel containing shells capable of rolling down said belt; means independent of said belt but cooperating therewith for retarding the normal movement of said mixture downwardly on said upper surface of said belt toward the lower end thereof, including a supporting member transverse to said belt and having suspended therefrom a plurality of strings of bead members adapted to cooperate with said corrugations to retard said normal movement; receiving means for receiving said nut kernel containing shells at the lower end of said upper surface of said belt; and means for rotating one of said belt rollers so as to move said upper surface of said belt upwardly to carry other components of said mixture thereon countercurrent to the direction of movement of said nut kernel containing shells.

3. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal; feed means aligned with said belt for continuously feeding a mixture of cracked nuts onto said upper surface of said belt adjacent the upper end thereof, said mixture including nut kernel containing shells capable of rolling down said belt; means for vibrating said feed means in the direction of said belt so as to move said mixture evenly onto said belt; receiving means for continuously receiving said nut kernel containing shells at the lower end of said upper surface of said belt and continuously conveying the same to a point of disposal; means for continuously rotating one of said belt rollers so as to move said upper surface of said belt upwardly to carry other components of said mixture thereon countercurrent to the direction of movement of said nut kernel containing shells; and means for continuously receiving said other components of said mixture from the upper portion of the upper surface of said belt and continuously conveying the same to a point of disposal.

4. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal; feed means for feeding a mixture of cracked nuts onto said upper surface of said belt adjacent the upper end thereof, said mixture including nut kernel containing shells capable of rolling down said belt; receiving means for receiving said nut kernel containing shells at the lower end of said upper surface of said belt; means for retarding the normal movement of said mixture downwardly on said upper surface of said belt toward the lower end thereof, said means including a screen member suspended above the upper surface of said belt between said feeding means and said receiving means and comprised of a screen formed of a plurality of adjacent individual strings of beads each of which is suspended from its upper end; means for rotating one of said belt rollers so as to move said upper surface of said belt upwardly to carry other components of said mixture thereon countercurrent to the direction of movement of said nut kernel containing shells; and means for adjusting the angle of said upper surface of said belt with the horizontal so as to vary the tendency of said mixture to move down said upper surface toward the lower end thereof.

5. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal; feed means for feeding a mixture of cracked nuts onto said upper surface of said belt adjacent the upper end thereof, said mixture including nut kernel containing shells capable of rolling down said belt; a supporting member supported over and transverse to said belt and having suspended therefrom a plurality of depending strings of beads; means for vertically adjusting the position of said supporting member relative to said upper surface of said belt; receiving means for receiving said nut kernel containing shells at the lower end of said upper surface of said belt; and means for rotating one of said belt rollers so as to move said upper surface of said belt upwardly to carry other components of said mixture thereon countercurrent to the direction of movement of said nut kernel containing shells.

6. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal; feed means for feeding a mixture of cracked nuts onto said upper surface of said belt adjacent the upper end thereof, said mixture including nut kernel containing shells capable of rolling down said belt; a first supporting member supported over and transverse to said belt and having suspended therefrom a plurality of depending strings of beads; a second supporting member between said first member and the lower end of said upper surface of said belt and supported over said belt, said second member being V-shaped and having the apex of said V pointed toward said feed means and having suspended therefrom a plurality of strings of bead forming a V-shaped screen above said upper surface of said belt; receiving means for receiving said nut kernel containing shells at the lower end of said upper surface of said belt; and means for rotating one of said belt rollers so as to move said upper surface of said belt upwardly to carry other components of said mixture thereon countercurrent to the direction of movement of said nut kernel containing shells.

7. In a device for separating from a body of cracked nuts pieces of shell containing nut kernels, the pieces of shell being capable of rolling down an inclined plane, the combination of: an upper belt roller; a lower belt roller; a continuous belt passing over said rollers so that the upper surface of said belt is disposed lengthwise upwardly from the horizontal; feed means for feeding a mixture of cracked nuts onto said upper surface of said belt adjacent the upper end thereof, said mixture including nut kernel containing shells capable of rolling down said belt; a plurality of supporting members, each being supported over and transverse to said belt and having suspended therefrom a plurality of depending strings of beads; means for vertically adjusting the position of each said supporting member relative to said upper surface of said belt; receiving means for receiving said nut kernel containing shells at the lower end of said upper surface of said belt; and means for rotating one of said belt rollers so as to move said upper surface of said belt upwardly to carry other components of said mixture thereon countercurrent to the direction of movement of said nut kernel containing shells.

LE ROY L. STEVENS.